United States Patent [19]

Clarke et al.

[11] Patent Number: 5,802,157
[45] Date of Patent: Sep. 1, 1998

[54] METHOD AND APPARATUS FOR CONTROLLING OUTGOING CALLS ON A TELEPHONE LINE

[75] Inventors: Gail L. Clarke; Karen A. Siegel-Jacobs, both of Boulder, Colo.; Lorraine M. Vienneau, Phoenix, Ariz.; Robert J. Cuthbertson, Lafayette, Colo.

[73] Assignee: U S West Technologies, Inc., Boulder, Colo.

[21] Appl. No.: 749,901

[22] Filed: Nov. 13, 1996

Related U.S. Application Data

[63] Continuation of Ser. No. 429,420, Apr. 26, 1995, abandoned.

[51] Int. Cl.$^6$ .................................................. H04M 3/42
[52] U.S. Cl. ....................... 379/196; 379/207; 379/188; 379/89
[58] Field of Search ............................ 379/196, 197, 379/198, 201, 207, 188, 189

[56] References Cited

U.S. PATENT DOCUMENTS

| | | | |
|---|---|---|---|
| 3,963,875 | 6/1976 | Gueldenpfennig | 379/309 |
| 4,096,356 | 6/1978 | Burtness et al. | 379/198 |
| 4,313,035 | 1/1982 | Jordan et al. | 379/210 |
| 4,351,986 | 9/1982 | Fechalos | 379/163 |
| 4,850,005 | 7/1989 | Hashimoto | 379/88 |
| 4,866,762 | 9/1989 | Pintar | 379/188 |
| 4,899,358 | 2/1990 | Blakley | 379/67 |
| 4,994,797 | 2/1991 | Breeden | 379/142 |
| 5,109,408 | 4/1992 | Greenspan et al. | 379/197 |
| 5,276,731 | 1/1994 | Arbel et al. | 379/88 |
| 5,329,578 | 7/1994 | Brennan et al. | 379/67 |
| 5,361,295 | 11/1994 | Solomon et al. | 379/67 |
| 5,375,161 | 12/1994 | Fuller et al. | 379/210 |
| 5,388,150 | 2/1995 | Schneyer et al. | 379/67 |
| 5,436,957 | 7/1995 | McConnell | 379/196 |
| 5,467,388 | 11/1995 | Redd, Jr. et al. | |

OTHER PUBLICATIONS

Pierce et al., "Meeting Private Needs With the Public Network", Bellcore Exchange, pp. 8–13, Jan. 1988.
Brennan et al., "Perspectives on the AIN Architecture," IEEE Communications Magazine pp. 27–32, Feb. 1992.

*Primary Examiner*—Krista Zele
*Assistant Examiner*—Daniel S. Hunter
*Attorney, Agent, or Firm*—Timothy R. Schulte

[57] ABSTRACT

A service for screening outgoing telephone calls. The service allows a subscriber to determine the times of day and/or days of the week when she wants her outgoing calls on her telephone line to be restricted to numbers which have been approved by her. Calls to numbers other than those on the authorized list will not be completed. Incoming calls are also restricted and a privileged caller code must be entered for the outside caller to complete the call to the subscriber.

20 Claims, 11 Drawing Sheets

EO - End Office
ISCP - Integrated Service Control Point
SSP - Service Switching Point (Switch)
SS7 - Signaling System 7
STP - Signal Transfer Point

METHOD AND APPARATUS FOR CONTROLLING OUTGOING CALLS ON A TELEPHONE LINE

CROSS REFERENCE TO RELATED APPLICATIONS

This application is a continuation of U.S. Pat. application Ser. No. 08/429,420 filed on Apr. 26, 1995 and entitled METHOD AND APPARATUS FOR CONTROLLING OUTGOING CALLS ON A TELEPHONE LINE, now abandoned. This application is related to U.S. Pat. application Ser. No. 08/505,497 filed on Jul. 21, 1995 and entitled CALL SCREENING USING SUBSCRIBER SPECIFIED TIMERS AND SCHEDULES.

BACKGROUND OF THE INVENTION

1. Field of the Invention

The invention relates to the field of telephonic communications. More particularly, the invention relates to the field of special services. In still greater particularity, the invention relates to the field of call diversion. By way of further characterization, but not by way of limitation thereto, the invention allows a telephone subscriber to control the times at which incoming and outgoing calls may be made.

2. Background of the Invention

As communication becomes more important in our society, telephone usage has increased. Many people view this as an improvement to their way of life. However, there are times when the telephone can become a nuisance such as when it rings during dinner or when a family activity is planned. Another situation where telephone calls may be undesirable is if children, especially teenagers, are present in the house and make numerous calls to, or are called numerous times by their friends, especially if those calls are made late at night.

In order to address the inconvenience surrounding unwanted interruptions, many telephone companies have inaugurated services such as "Do Not Disturb" which eliminate incoming telephone calls during inconvenient times. While prior art systems such as Do Not Disturb services have addressed the issue of blocking incoming calls during certain periods, it would also be desirable to have some control over calls made from the subscriber's phone. In the case of teenagers who are supposed to be doing other activities such as homework, it would be advantageous to have the capability to limit their use of the telephone for outgoing calls. This is especially relevant in the situation where a second telephone line has been installed on the subscriber premises especially for the use of the teenager. If the telephone is located in the bedroom of the teenager or in the basement of the home, there may be limited opportunity for the parent to monitor use of the second telephone line. If the parent or guardian could limit use of the telephone line such that calls could not be made late at night or during homework periods, then more parents may be willing to subscribe to additional lines.

While subscribers may want to limit incoming and outgoing calls during certain periods, they may also want certain callers to be able to reach them during those periods. They may also want certain outgoing calls to be completed during times when the line is otherwise blocked. For example, the subscriber may never want to block outgoing emergency calls to 911 or calls to the police station.

SUMMARY OF THE INVENTION

The invention allows a subscriber to block incoming and outgoing calls indefinitely or where based upon specific times of the day for weekday or weekend screening. When the service is active, calls from the subscriber line will only be completed to numbers on the authorized outgoing number list, the administration number, and 911. During the same time, only incoming calls to the subscriber's number which are accompanied by a predetermined privileged caller code will be completed. This code can be used by privileged callers to allow access to the subscriber's number even when the service is active.

The service can be turned on or off manually by the subscriber or automatically through schedules. Subscribers can customize and control their profile by using a touch tone phone to change weekday/weekend schedules. The subscriber can also activate or deactivate the service for an indefinite period, change security and privileged caller codes, and select greetings from a prerecorded set of voice announcements. The subscriber may also change the authorized outgoing number list for outgoing calls.

When the service is off, all incoming calls will be sent to the subscriber's telephone number for normal call processing. If the subscriber's telephone is not in use, the subscriber's telephone will ring and the caller will hear the audible ringing. All outgoing calls will be processed normally when the service is off.

When the service is active, incoming calls will be directed to the subscriber's direct inward dial number to play the greetings. If the caller inputs the required privileged caller code the call will be completed. If the code is not entered, the caller will hear an announcement that the subscriber is unavailable. If the subscriber has a messaging service, the caller will be asked to stay on the line to leave a message. If there is no messaging service, then the call will be terminated.

For outgoing calls when the service is on and the dialed number is recognized as being on the authorized outgoing number list, the call will be routed normally. Otherwise the subscriber will hear an announcement that the phone is off and the call will not be completed. If the subscriber wants to set a privileged caller code, he or she establishes it and gives the code number to privileged callers. The privileged caller code can be changed at any time through a touch tone phone. Privileged callers input the code during the greeting or within 4 seconds thereafter to complete a call to the subscriber.

DESCRIPTION OF THE PREFERRED EMBODIMENT

Figure 1:
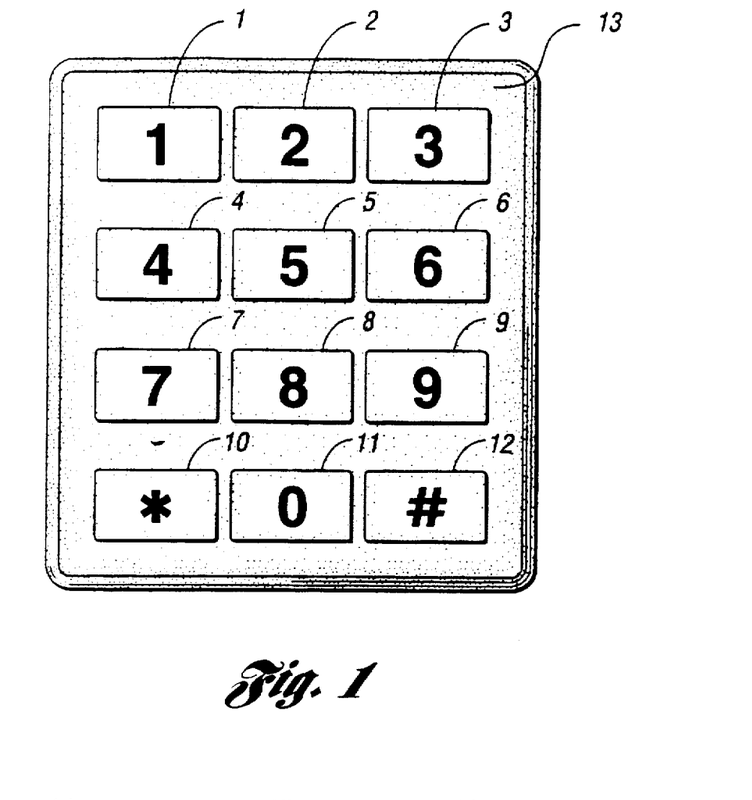
FIG. 1 illustrates a DTMF keypad on a telephone.

Reference is now made to the drawing figures wherein like reference numerals denote like elements throughout each of the various figures. Referring to FIG. 1, a Dual Tone Multifrequency (DTMF) keypad 13 is shown with keys 1–9, *, O, and # numbered 1–12 respectively. Service features embodied in the present invention may be activated using the DTMF keypad 13. Subscribers may access the service from any touch tone phone which, by definition, includes a DTMF keypad 13. Voice instructions, in the form of prompts, guide the user through menus.

The service is implemented by an Advanced Intelligent Network (AIN) architecture. The network includes Common Channel Signaling (CCS). CCS provides the link between a circuit switched voice telephone network and ISCP database service applications. The CCS network also routes query and response messages between Service Switching Points and ISCPs within a CCS network. CCS networks are also known as Signaling System Number 7 or SS7 Networks. The service is implemented by application software residing on an Intelligent Service Control Point (ISCP) with service defining logic to create individual call handling instructions. An ISCP is a network system that supports network service databases. The ISCP provides call treatment information in response to queries from the CCS Network. ISCPs share a set of common software components which, taken together, represent a software platform and which is referred to as node software.

Figure 2:
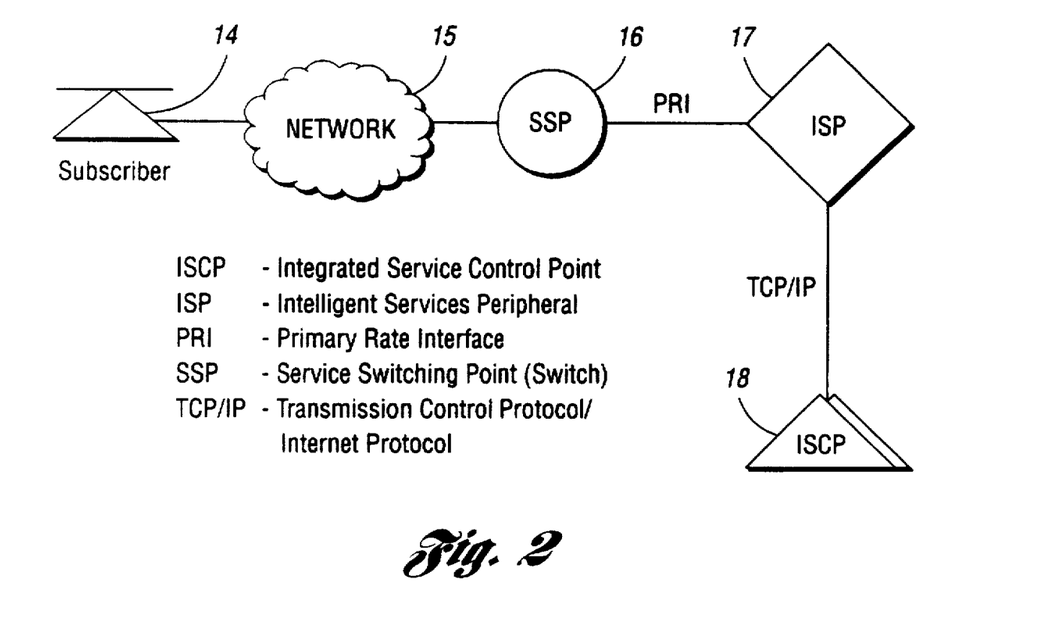
FIG. 2 illustrates the architecture for updating the subscriber profile.

Triggers on the telephone lines cause software resident on the ISCP to execute, which initiates incoming, outgoing and subscriber profile portions of the service. Referring to FIG. 2, the network architecture used to enable the subscriber to create and update the service profile is shown. A local telephone number (referred to herein as the administration number) is provided in each calling area for subscribers to call in order to listen to or make changes to their service profiles. Calls to the administration number do not have to originate from the subscriber's phone. When a subscriber dials a local telephone number from her telephone line 14 associated with the service, the call is routed through the Public Switched Telephone Network (PSN) 15 and switch 16 to the Intelligent Services Peripheral (ISP) 17. The ISP provides the announcements and instructions to the subscriber to request the input of certain DTMF commands required in the DTMF menus.

The DTMF menus prompt the caller to enter the subscriber's 10 digit telephone number. The ISP sends a message to the ISCP 18 to verify that the telephone number is a valid service subscriber. If the call is for a valid subscriber number, then the caller is prompted to enter a 4 digit security code. Once the security code is validated by ISCP 18, the ISCP instructs ISP 17 to play a message informing the caller of the current status of the subscriber service for the normal DTMF interface. In response to the instructions from the ISP the subscriber enters the desired digits on the DTMF keypad in order to create or modify the user profile as will be discussed below. ISP 17 forwards the information to ISCP 18 which in turn instructs the ISP whether or not more information is needed. If more information is needed then the subscriber is again asked for information. If no more information is needed then ISP 17 is instructed to terminate the call.

Figure 3:
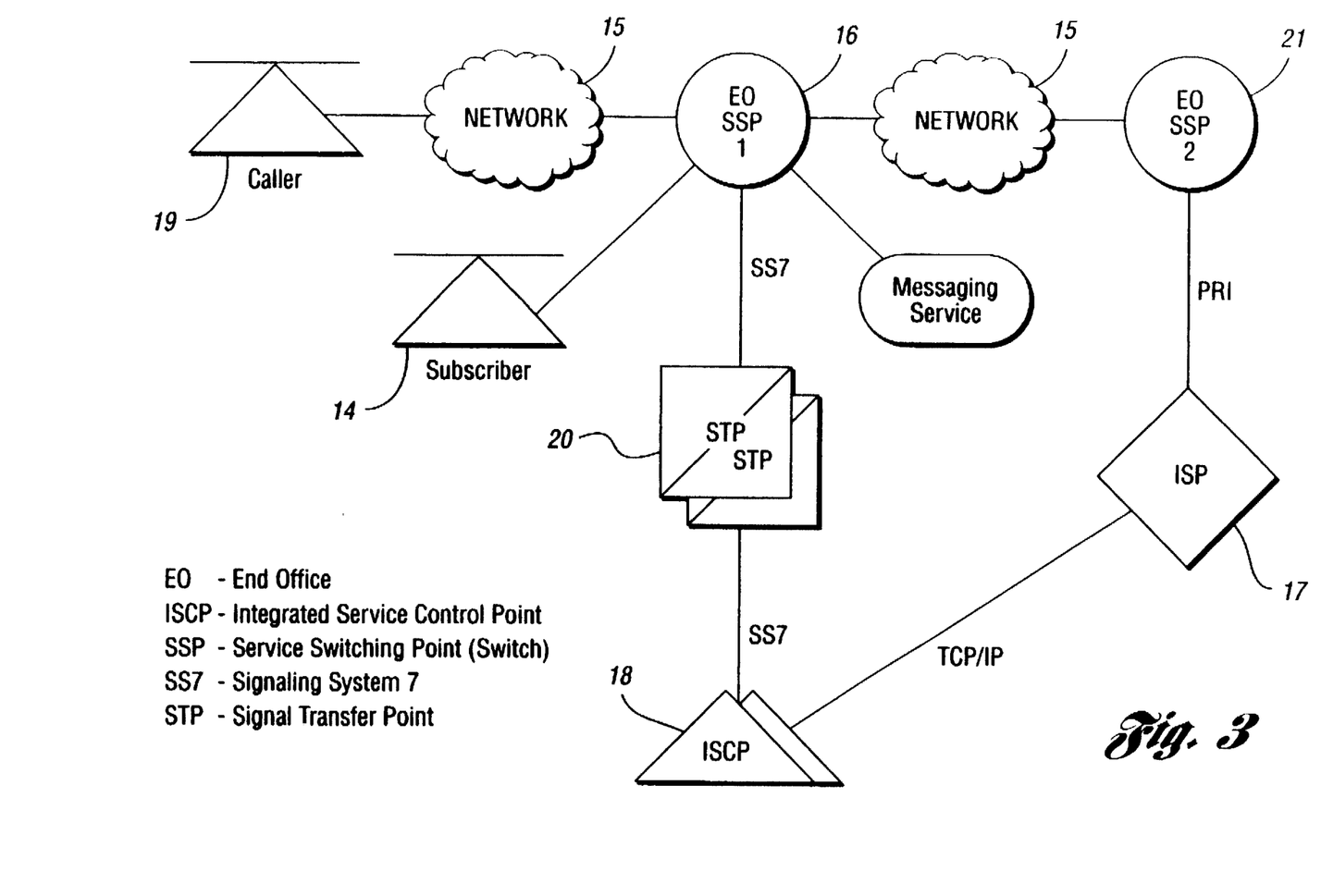
FIG. 3 illustrates the architecture for routing incoming calls to a subscriber.

Referring to FIG. 3 the architecture for routing incoming calls to the subscriber is shown. When a caller 19 dials the telephone number of the subscriber telephone line 14, the switch 16 serving the subscriber detects a set trigger on the subscriber line as is known in the art. A query is sent to ISCP 18 through a Signal Transfer Point (STP) 20 and the ISCP 18 performs a lookup into the subscriber service profile to determine whether the service is on or off. An STP is a switch that acts like a packet switch and performs translation functions and controls the routing of CCS messages through a CCS network. If ISCP 18 determines that the service is off then the ISCP sends an instruction through STP 20 to the switch 16 to route the call to the subscriber line 14. If ISCP 18 determines that the service is on, then the call is routed back to the STP 20 which returns it to the switch 16 which in turn routes it to a switch 21 serving the ISP 17. ISP 17 requests instructions on how to handle the call from the ISCP 18. Pursuant to those instructions ISP 17 plays an announcement which has been preselected by the subscriber. ISP 17 does not prompt the caller to enter the privileged caller code (PCC) in order to avoid alerting non-privileged callers that such an option is available. If the caller does not enter the privileged caller code, she is either routed to a messaging service if the subscriber has such service or the call is terminated. If the caller enters a privileged caller code ISCP 18 verifies the code and ISP 17 initiates a call to the subscriber telephone line through the switches 16 and 21 connecting the caller and subscriber when the subscriber telephone is answered. If the subscriber line is busy, ISCP 18 instructs ISP 17 to play an announcement indicating such. If the subscriber does not answer after a predetermined number of rings, then ISCP 18 instructs ISP 17 to play an announcement indicating that there is no answer.

Figure 4:
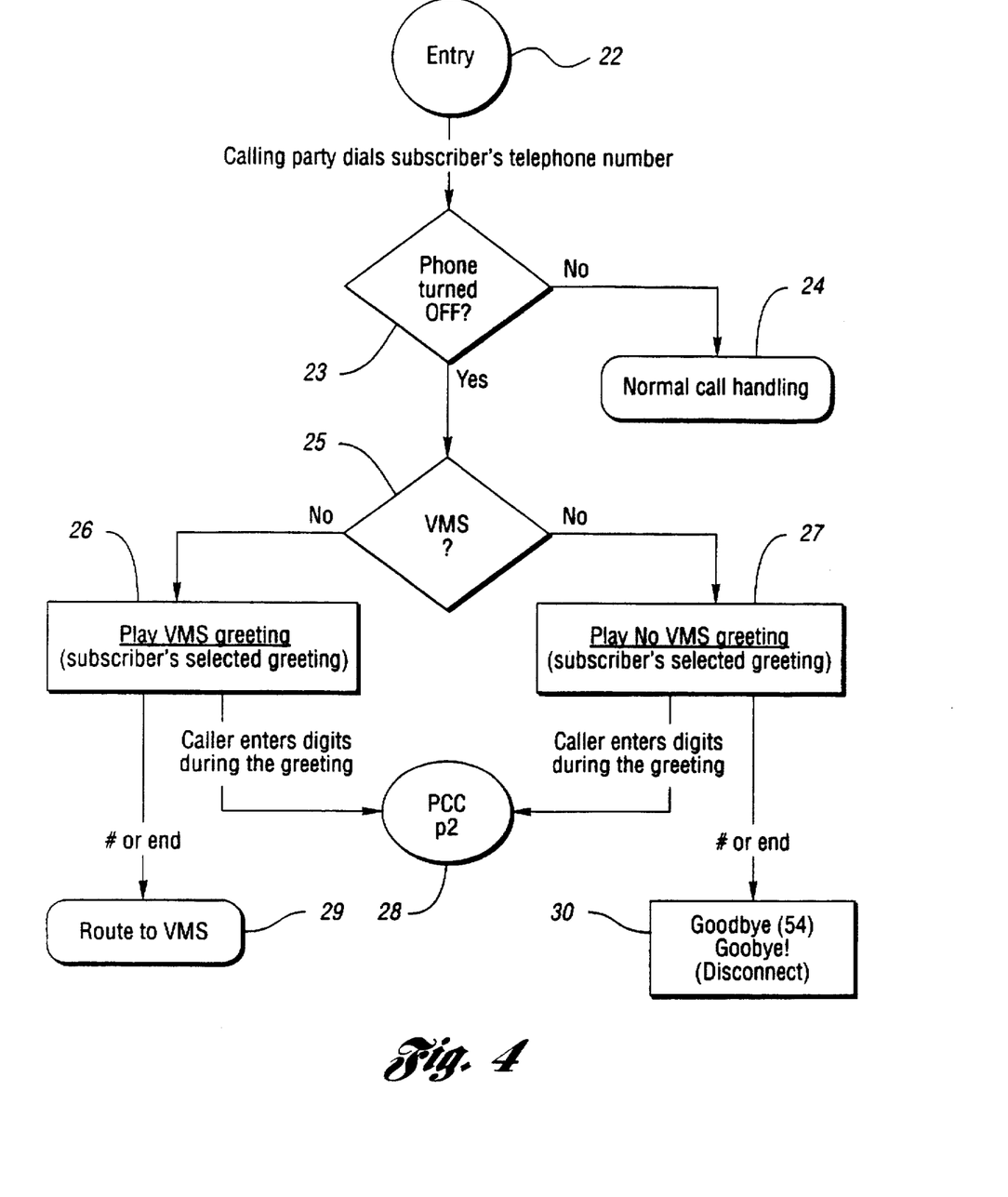
FIG. 4 is a call flow chart for incoming calls to a subscriber line.

Referring to FIG. 4, a call flow chart for incoming calls to a subscriber line is shown. When a calling party dials the subscriber's telephone number and enters the service at 22, the service determines at step 23 whether the service is on or off. If the service is not active then the call is handled in a normal fashion at step 24. If the service is on, then a check is done at 25 to see whether or not the subscriber has voice messaging. The appropriate greeting is played at 26 and 27. If the calling party enters the privileged callers code during the greeting at step 26 or 27 or within 4 seconds of the termination of the greeting, then the call is routed to step 28 and FIG. 5. If, at step 26 or 27 the caller does not enter the PCC, and if the subscriber is a VMS subscriber, the caller is routed to a Voice Messaging Service (VMS) at step 29 as is known in the art. If the subscriber does not have VMS, then the service plays an announcement asking the caller to try again later and terminates the call at 30.

Figure 5:
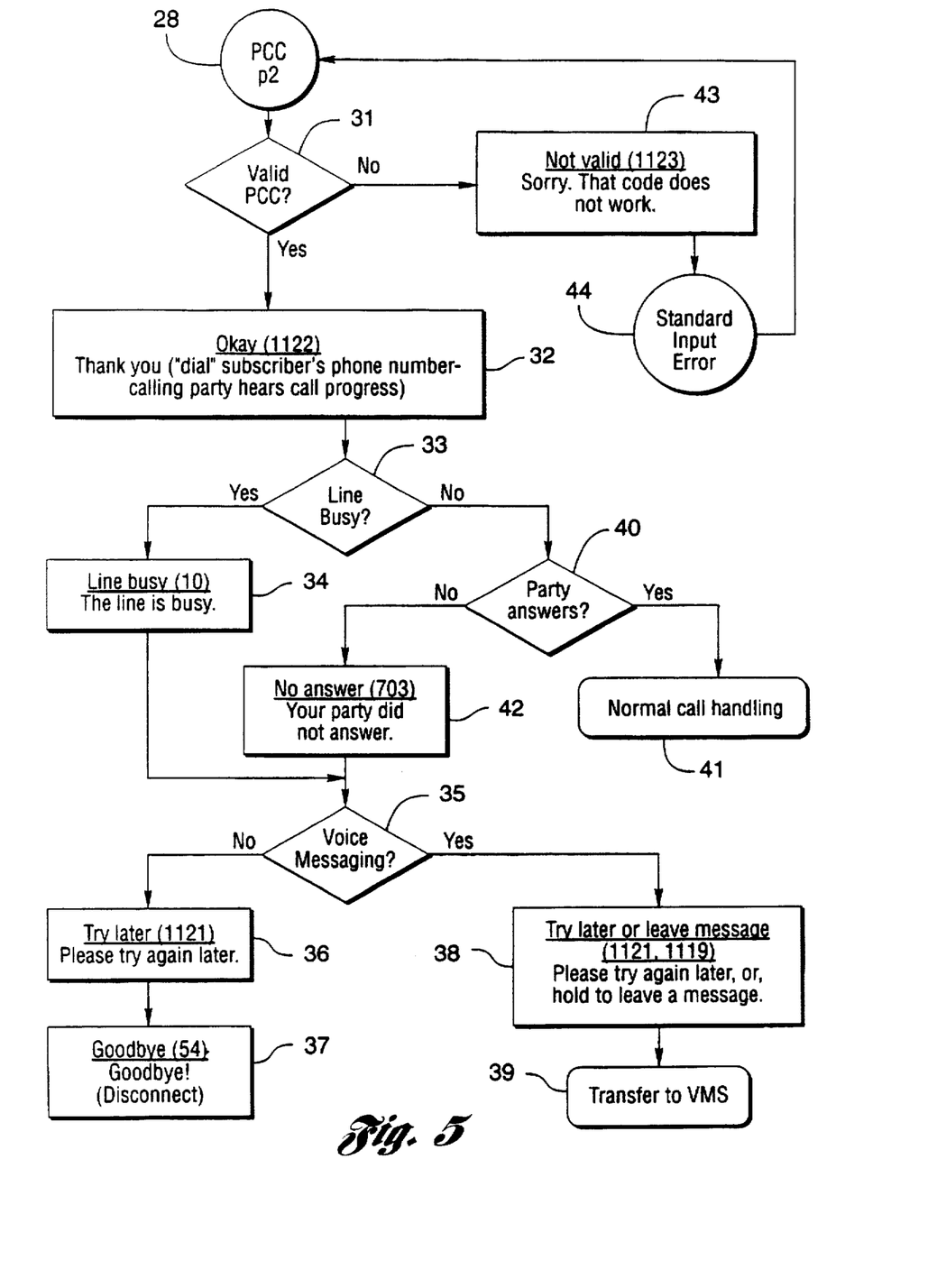
FIG. 5 illustrates the steps taken when a caller enters the preferred caller code.

Referring to FIG. 5, if the caller to a subscriber line enters a PCC at step 26 or 27 in FIG. 4, then she is routed to step 28 in FIG. 5. If the PCC is validated by the service at 31, then the system dials the subscriber's telephone line at 32 and a check is made at 33 to see if the line is busy. If it is busy the caller is so advised at 34. A further check is then made to see if the subscriber has voice messaging at 35. If the subscriber does have voice messaging then, at 38, the caller is given a choice between calling again later or holding to leave a message. If the caller holds, the call is routed to voice messaging at 39. If the subscriber does not have voice messaging or the line is busy after a PCC has been entered, the caller is asked to try again later at 36 and the call is terminated at 37. If a valid PCC is confirmed at 31 and the line is not busy, a check is made at 40 to see if the subscriber answers. If the subscriber answers then the call is processed as usual at 41. If the party does not answer, the same check for voice messaging described above occurs and the call is either terminated or the caller is sent to voice messaging (steps 35-39). If the entered PCC is not validated at step 31 then the caller is so advised at 43 and the caller is given three attempts to enter a valid PCC at 44. If the caller is not successful in entering the valid PCC in three attempts then the call is terminated.

Figure 6:
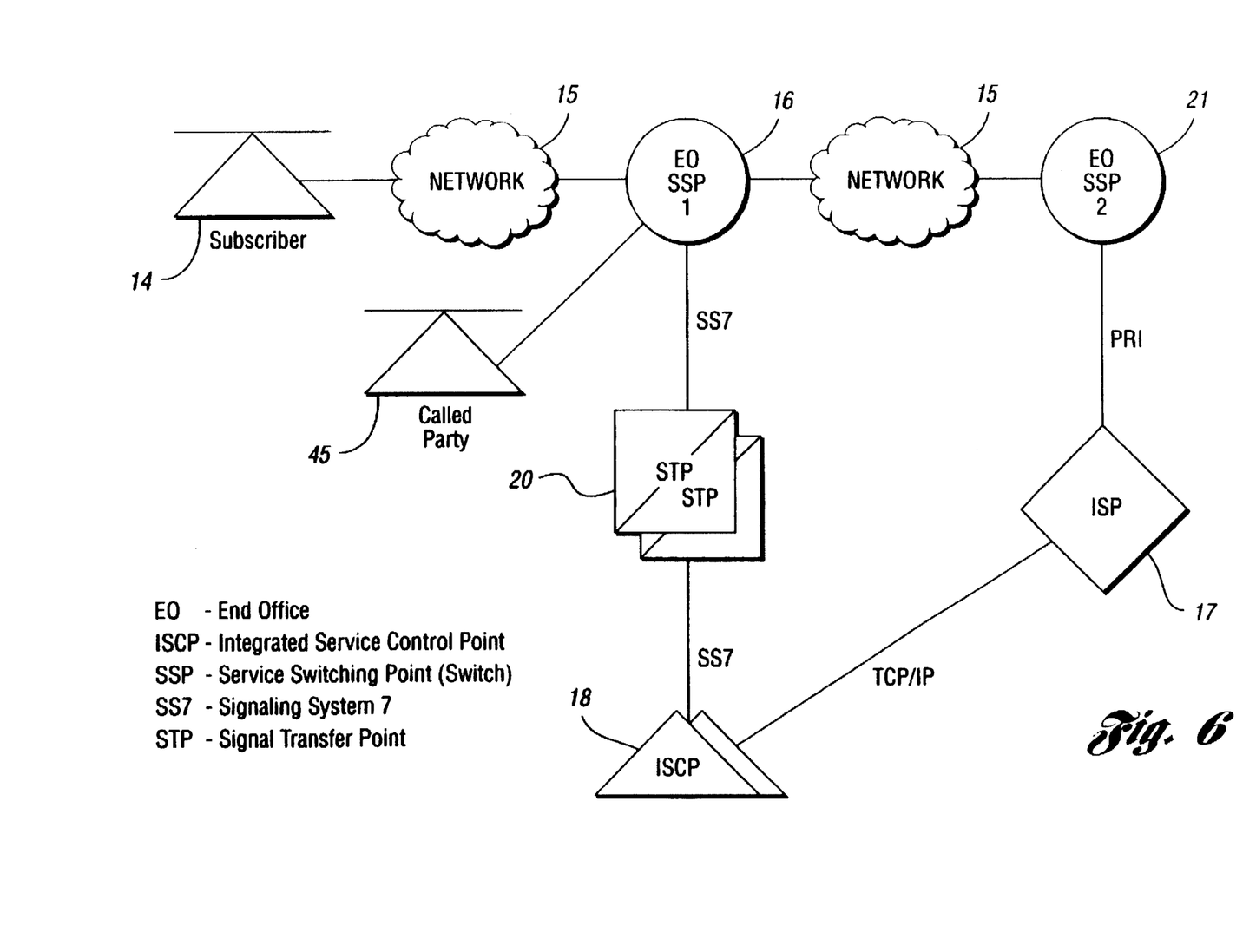
FIG. 6 illustrates the architecture associated with outbound calls from the subscriber telephone line.

Referring to FIG. 6, the architecture associated with outbound calls from the subscriber telephone line is shown. When someone from the subscriber telephone line 14 dials the number of a called party 45 the switch 16 detects a trigger point associated with the service. A query is sent to ISCP 18 through STP 20. ISCP 18 performs a lookup into the subscriber profile to determine the status of the service. If the service is off, the ISCP 18 instructs the switch 16 to route the call to the called party 45. If ISCP 18 determines that the service is on, then the called party telephone number is checked against the authorized outgoing number list. If the number is on the list then ISCP 18, through the STP 20, instructs the switch 16 to route the call to the called party 45. If the dialed number is not on the authorized outgoing number list, then ISCP 18 instructs switch 16 to route the call to ISP 17 via Service Switching Point (SSP) 21. An SSP is an imbedded system controlled hardware switch module located in the local network. SSPs provide local network access to ISCP database oriented network services. The primary function of the SSP is to process calls that require remote database handling or control. At ISP 17, the Automatic Number Identification (ANI) of the calling number is checked against the subscriber's telephone number. If the numbers match, then a terminating announcement is played indicating that the phone is off and the call is terminated.

Figure 7:
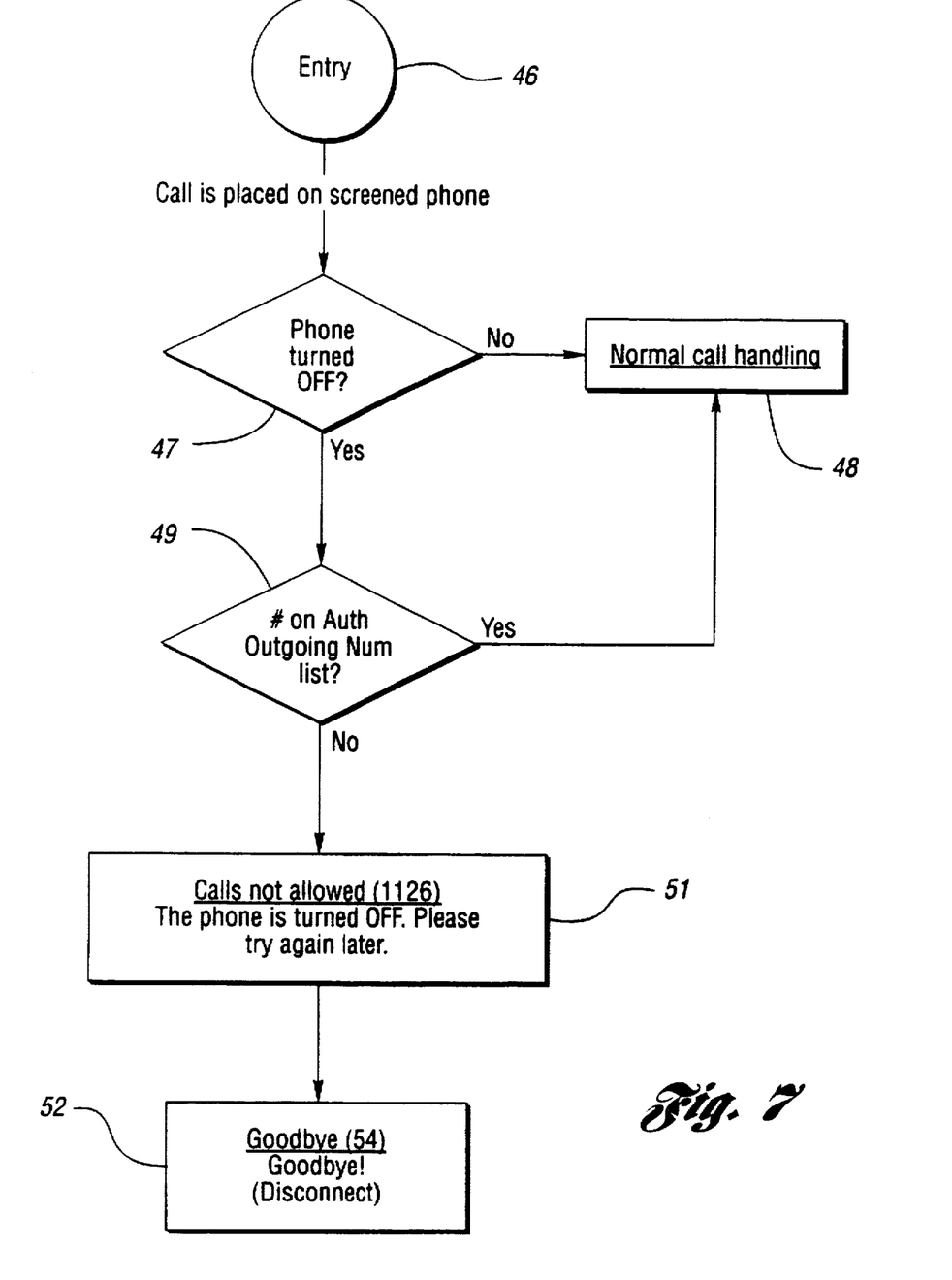
FIG. 7 is a flow chart illustrating the sequence of steps employed by the service when a subscriber attempts to place a call.

Referring to FIG. 7, a flow chart illustrating the sequence of steps employed by the service when a subscriber attempts to place a call from her telephone line is shown. When a call is placed from a telephone line on the service at 46, the service determines at 47 whether the service is on or off at that time. If the service is not on, then the call is handled in the normal manner by the network at 48. If the telephone number dialed is on the authorized outgoing number list as determined by the service at 49, then the call is also handled in the normal manner at 48. If the called number is not on the authorized list, then the caller from the subscriber's line is so notified at 51 and disconnected by the service at 52. It should be understood that calls to 911 and the administration number need not be put on the authorized outgoing number list as calls to these numbers will always be connected.

By using a touch tone phone keypad as shown in FIG. 1 the subscriber can access his or her profile by dialing the administration number and then entering the telephone number of the subscribing line. The subscriber can customize and control the profile using the DTMF keypad as will be discussed below. The subscriber is given a temporary security code to access the profile for the first time. The subscriber changes the code to a permanent one on the first call and may change it again on subsequent calls. Similarly, a privileged caller code (PCC) may be established by the subscriber to allow incoming callers to override call blocking. The authorized outgoing number list allows the subscriber to enter up to ten phone numbers that will always be completed when dialed from the subscriber line even when the service is on. Both the PCC and the authorized outgoing number list may be changed by the subscriber at any time.

The subscriber may elect two types of screening activation. The first is "until further notice" which turns the service on or off until the subscriber changes it. The second type of screening is to have the service turn on or off according to schedules. These schedules automatically block incoming and outgoing calls at specified times of the day. The subscriber can specify two schedules each for weekdays and weekends. Upon service start-up two preset default schedules are active. These default schedules are for a certain time period e.g. (10 PM-6 AM) on weekday school nights (Sun.-Thur.) and another time period (11 PM-7 AM) on weekend nights (Fri.-Sat.).

In order to activate or change the options in the service described above the subscriber calls into the service and interfaces with the service using a touch tone phone as is known in the art. For example, voice messaging utilizes similar interfaces requiring the user to respond to prompts by entering DTMF signals. When the subscriber calls the administration update center number for the first time, she is sent to an interactive tutorial. In this tutorial, the subscriber is prompted to personalize 5 features of the call flow service: security code; greeting; PCC; schedules; and authorized outgoing number list.

Figure 8:
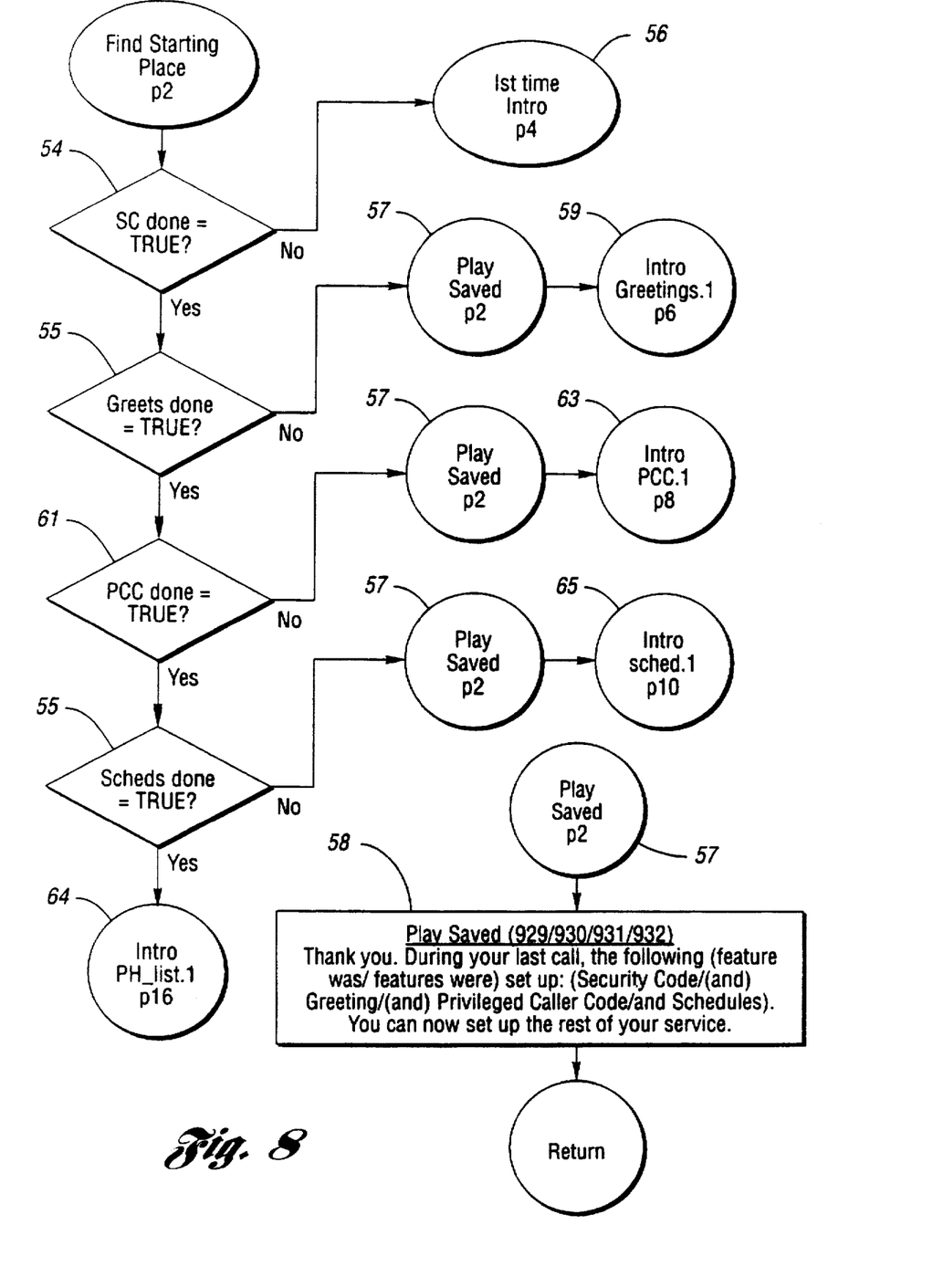
FIG. 8 is a flow chart illustrating the interruptible subscriber tutorial feature.

Referring to FIG. 8, a flow chart illustrating how the interruptible first time subscriber tutorial works is shown. The tutorial recognizes which of the five features, if any have been previously customized by the subscriber. That is, when the subscriber enters the service, the system searches to find out if the subscriber has previously entered the tutorial and if so, which options she has already customized. This is especially useful where the subscriber has exited the tutorial prior to customizing all of the options. For example, the subscriber may have been in the process of customizing the options when she was disconnected or otherwise terminated the call. Any and all changes which have been confirmed by the caller on the previous call are saved. On the subscriber's next call following such an interruption, an announcement is played indicating which features have been set up. The subscriber is then routed to the first unfinished feature and the tutorial begins there. The process continues for all subsequent calls until the entire tutorial has been heard and selections for all features have been confirmed by the subscriber.

Referring again to FIG. 8, if a system check determines that the entire tutorial has not yet been heard, the system performs the search to locate the starting place at 53. The security code is the first query at 54. If the security code has not been changed from the temporary code, the caller is sent to the beginning of the tutorial at 56 and asked to change that code. If the security code has been changed and confirmed by the subscriber then the system checks at 55 whether the subscriber has either chosen to accept the default greeting or selected an alternate greeting. If the greeting was not confirmed as queried at 55 then the system moves to the play saved step 57. The subscriber is advised in step 58 that in the last call the security code was set up and the system will begin with the greetings feature at 59 as is also known in the art. If the greetings have been completed, the system checks at 61 to see of the subscriber has either set up a PCC or confirmed that no PCC is desired. If the PCC feature has not been customized and confirmed by the subscriber previously then the play saved function at 57 advises the subscriber of what features have been completed and the subscriber is taken to the PCC tutorial at 63. If the PCC feature has been confirmed, the service checks to see if the subscriber has confirmed what schedules, if any, are desired. If the scheduling feature was completed previously then the subscriber is taken directly to the authorized outgoing number list tutorial at 64 and given the option to add numbers to that list as will be described below. If the scheduling feature was not previously completed, then the play saved function at 57 advises the subscriber of this and the subscriber is taken to the schedule tutorial at 65 to customize this feature as is known in the art.

Figure 9:
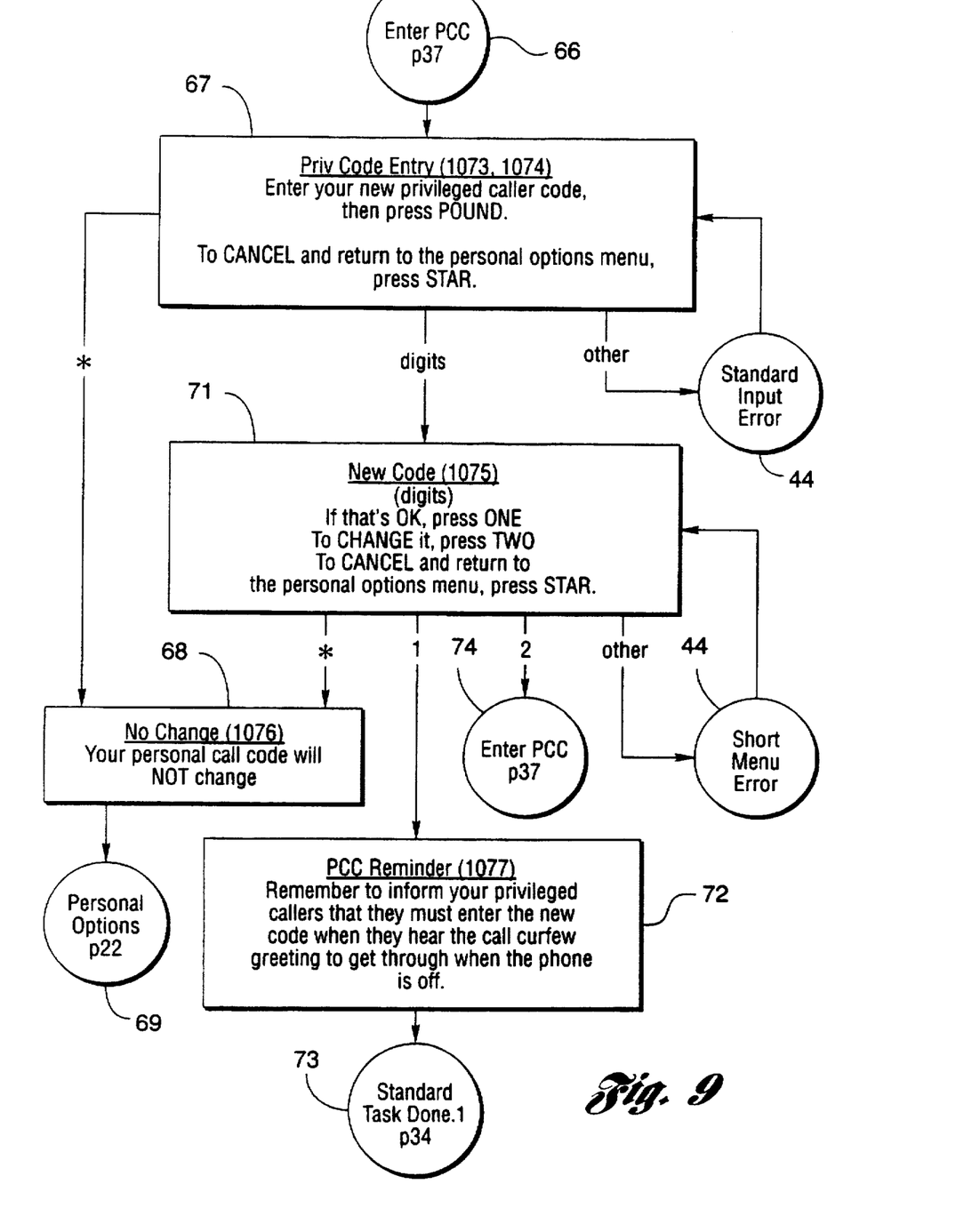
FIG. 9 is a flow chart for changing the privileged caller code (PCC)

Referring to FIG. 9, the flow chart for changing the privileged caller code (PCC) as part of the regular DTMF menus is shown. The subscriber calls the service administration number which can always be accessed even when the service is activated. The subscriber accesses the system by entering the ten digit subscriber number and enters the system using the security code through a menu similar to the VMS type of menu at 66 and the system requests a new PCC at 67. The user may press the * key 10 on DTMF keypad 13 to exit and return to the previous menu as is known in prior art voice messaging systems. If the * key 10 is pressed at 67, the subscriber is notified that the PCC will not change at 68 and returned to the personal options menu at 69. If the subscriber enters a new PCC at 67, then the system prompts the subscriber to confirm the new PCC at 71 or to indicate that it should again be changed. The subscriber may also press * key 10 at step 71 to return to the previous menu at 69. If the subscriber confirms the new PCC at 71, then the system reminds the subscriber to inform the privileged callers of the new PCC at step 72 and the subscriber is routed to the appropriate menu at 73. If at step 71 the subscriber presses the designated DTMF key to further change the PCC, then she is routed back into the system at step 66. If at either of steps 67 or 71 the subscriber makes an error then she is given a predetermined number of attempts to correct the mistake before being terminated at 44.

Figure 10:
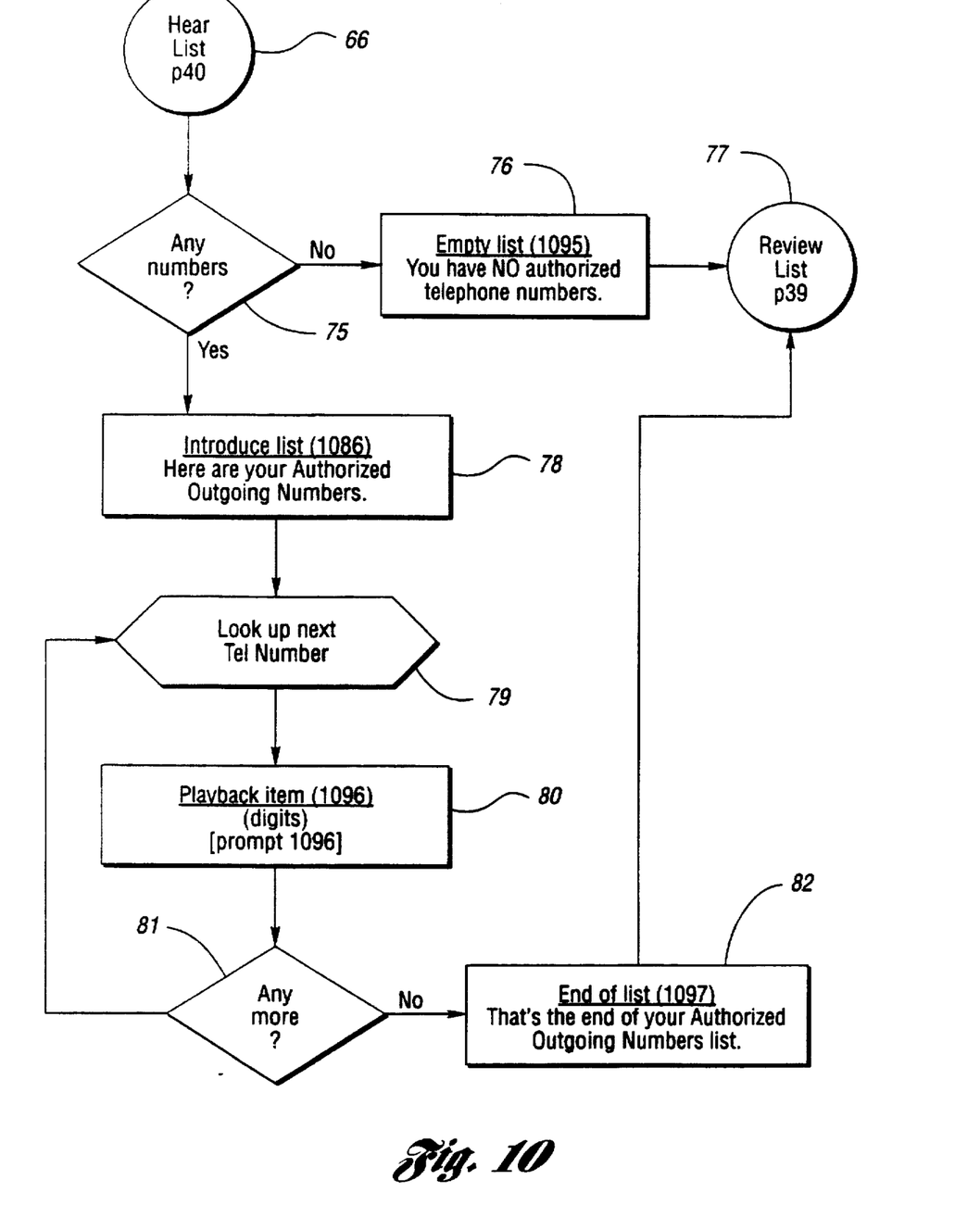
FIG. 10 is a flow chart illustrating the steps taken by the subscriber in order to hear the numbers currently on the authorized outgoing number list.

As stated above, the service, when turned on, only allows outgoing calls from the subscriber's line to numbers on the authorized outgoing numbers list, the administration number, and to 911. The subscriber may desire to create or change the authorized list. Referring to FIG. 10, in order to hear the numbers currently on the outgoing number list the subscriber accesses the system at step 66 as in FIG. 8. The system determines at step 75 whether or not there are any numbers on the list. If there are no numbers on the list, then the subscriber is so advised at 76 and routed back to the previous menu at 77. If the system determines at step 75 that there are numbers currently on the list, then the subscriber is so advised at step 78 and the numbers are played sequentially at steps 79 and 80 until the system determines that there are no more numbers on the list at step 81. The subscriber is advised at step 82 that the entire list has been played and she is routed to the previous menu at step 77.

Figure 11:
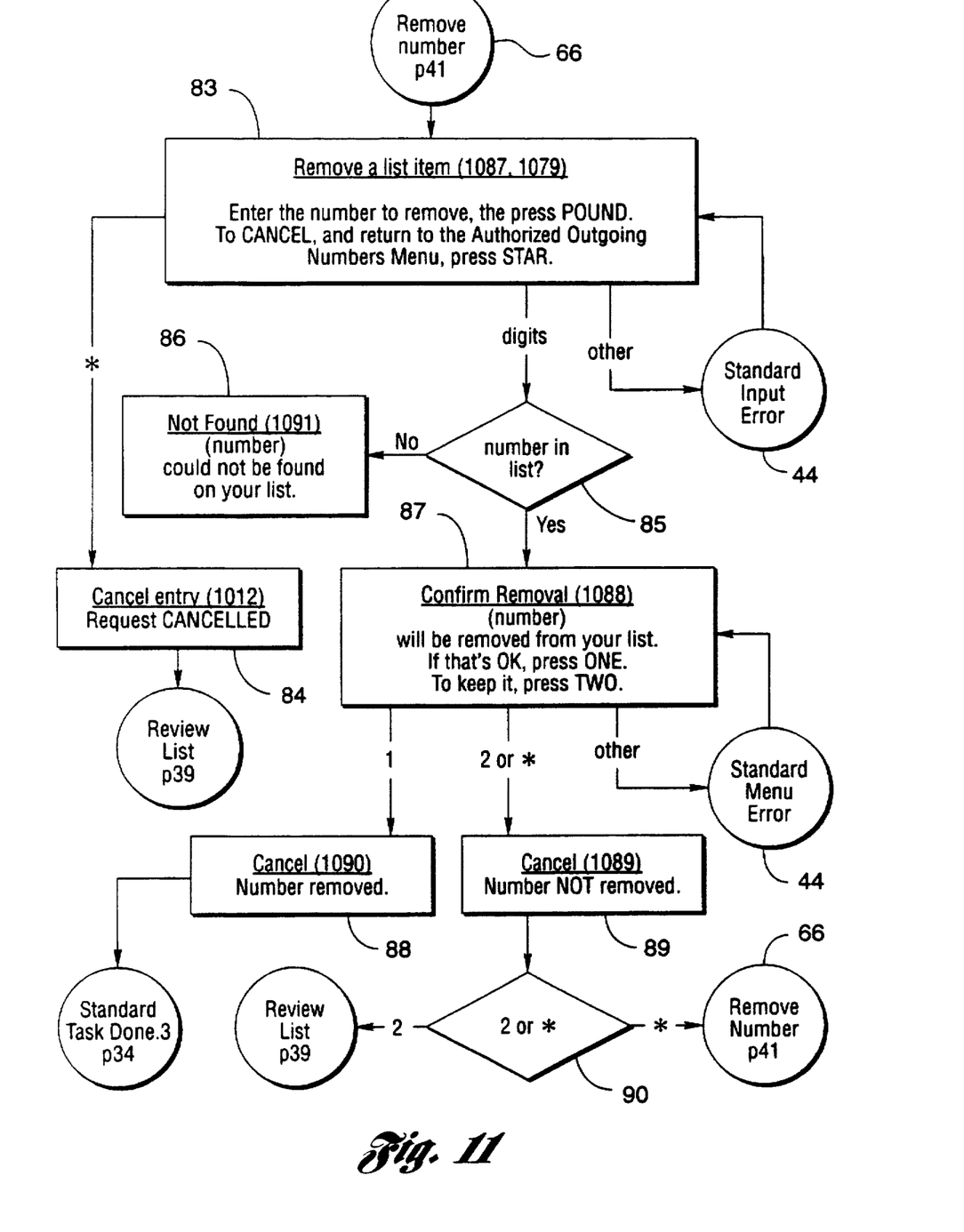
FIG. 11 is a flow chart illustrating the steps taken by the subscriber in order to remove a number from the authorized outgoing number list.

Referring to FIG. 11, if the user desires to remove a number from the authorized outgoing number list, then she accesses the system as described at step 66. At step 83 the user is advised to enter the number to be removed followed by # key 12 to remove the number. The user is also prompted to press * key 10 to cancel the request and return to the previous menu at step 84. If the number entered at step 83 is not recognized as being on the list by the system at step 85, the subscriber is so advised at step 86. The subscriber is then returned to step 83. If the number entered at step 83 is recognized at step 85 then the system asks the user to confirm the removal of the number at step 87. If the subscriber presses a predetermined DTMF key (i.e. key 1) to confirm removal the number is removed at step 88. If the subscriber presses a predetermined DTMF key (i.e. key 2) at step 87 to keep the number on the list or if the subscriber presses the * key 10 at this point, then the number removal is canceled at step 89. If the cancellation at 89 was due to input of the * key 10, the subscriber is routed to step 90. If cancellation is due to pressing a DTMF key (e.g. 2), then the subscriber is returned to step 66 at 90.

Figure 12:
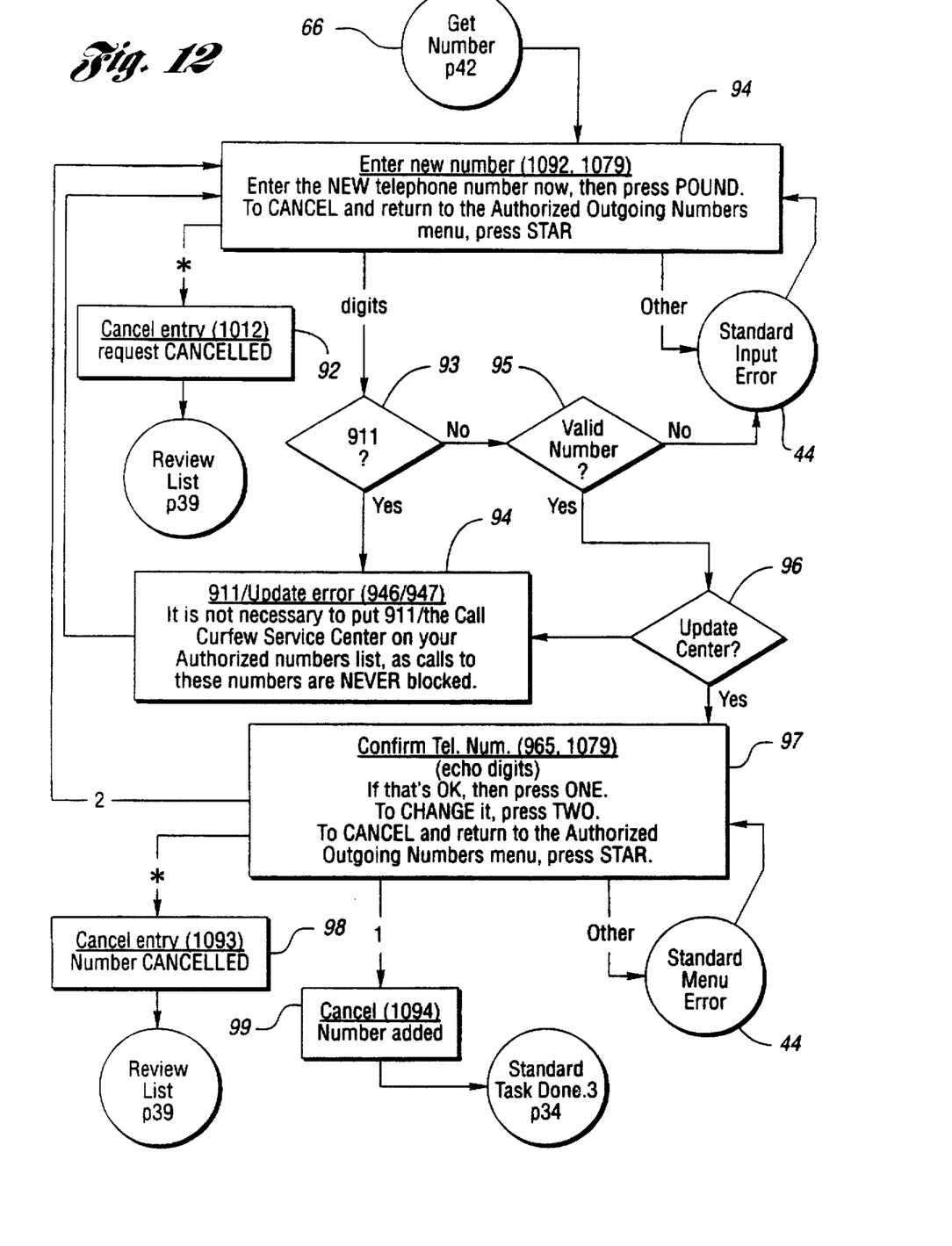
FIG. 12 is a flow chart illustrating the steps taken by a subscriber to add a telephone number to the authorized outgoing number list.

Referring to FIG. 12, the subscriber may also add a telephone number to the authorized outgoing number list. The subscriber enters the system as before and proceeds to step 66. The system prompts the subscriber to enter the new telephone number at step 91. As with the other menus the subscriber may press the * key 10 to cancel the request and return to the previous menu at step 92. If a number is entered at 91 then the system checks at step 93 to see if the entered number was 911. If the user entered 911, at step 94 the system advises the user that entering 911 is not necessary and the user is returned to step 91. If the user entered a number other than 911 the system checks to see if it is a valid number at step 95. If it is not a valid number then the user is given the opportunity to correct the error at step 74 as previously described. At step 96 the system checks to see if the new number is the system administration number. If the system administration number has been entered, then the user is also routed to step 94 and advised that, as with 911, entry of this number is not necessary as it is never blocked. If the number entered at step 91 is a valid number, and not 911 or the system administration number then the system will repeat the number at step 97 and ask the user for confirmation of the number addition. The user may also press the * key 12 to return to the previous menu at 98. Finally, the user may confirm the number to be added at step 97 and the system will confirm the addition and add the number at step 99. If the user had made an error the standard error menu will allow the user a certain number of correction attempts at step 44.

While the invention has been disclosed with respect to a preferred embodiment thereof, it is not to be so limited as changes and modifications may be made which are within the full intended scope of the invention as defined by the appended claims. For example, while certain DTMF keys may be specified to exit a menu or step or to confirm or delete an entry, it should be expressly understood that the selection of specific keys form no part of the invention. Similarly, the selection of wording for announcements, for example, are a matter of design choice.

What is claimed is:

1. A method for controlling an outgoing telephone call from a telephone line associated with a subscriber to a called telephone number, the method comprising:

detecting a trigger point on the line indicative of a screening service;

determining whether the screening service is active or inactive including comparing a time of day and a day of week at which the outgoing call is attempted to a preset active schedule, wherein the preset active schedule is modifiable by the subscriber;

routing the outgoing call through a Public Switched Telephone Network (PSTN) if the service is inactive;

comparing the called number to at least one telephone number on an authorized outgoing numbers list if the service is active, the at least one telephone number having at least seven digits;

routing the outgoing call through the PSTN if the called number is on the authorized outgoing numbers list; and advising the subscriber via the line that the outgoing call cannot be completed if the called number is not on the authorized outgoing numbers list.

2. The method of claim 1 wherein the authorized outgoing numbers list is modifiable by the subscriber.

3. The method of claim 1 wherein an outgoing telephone call from the line to an emergency telephone number is routed whether or not the emergency number is on the authorized outgoing numbers list.

4. The method of claim 1 wherein an outgoing telephone call from the line to an administration telephone number associated with the screening service is routed whether or not the administration number is on the authorized outgoing numbers list.

5. The method of claim 1 wherein the preset active schedule comprises a default schedule prior to deployment of the screening service on the line.

6. A system for controlling an outgoing telephone call from a telephone line associated with a subscriber to a called telephone number, the system comprising:

means for detecting a trigger point on the line indicative of a screening service; and control logic operative to determine whether the screening service is active or inactive by comparing a time of day and a day of week at which the outgoing call is attempted to a preset active schedule, wherein the preset active schedule is modifiable by the subscriber, route the outgoing call through a Public Switched Telephone Network (PSTN) if the service is inactive, compare the called number to at least one telephone number on an authorized outgoing numbers list if the service is active, the at least one telephone number having at least seven digits, route the outgoing call through the PSTN if the called number is on the authorized outgoing numbers list, and advise the subscriber via the line that the outgoing call cannot be completed if the called number is not on the authorized outgoing numbers list.

7. The system of claim 6 wherein the authorized outgoing numbers list may be modified by the subscriber.

8. The system of claim 6 wherein the control logic is further operative to route an outgoing telephone call from the line to an emergency telephone number whether or not the emergency number is on the authorized outgoing numbers list.

9. The system of claim 6 wherein the control logic is further operative to route an outgoing telephone call from the line to an administration telephone number associated with the screening service whether or not the administration number is on the authorized outgoing numbers list.

10. The system of claim 6 wherein the preset active schedule comprises a default schedule prior to deployment of the screening service on the line.

11. A method for controlling an outgoing telephone call from a telephone line associated with a subscriber to a called telephone number and an incoming telephone call from a calling party to the line, the method comprising:

detecting a trigger point on the line indicative of a screening service;

determining whether the screening service is active or inactive including comparing a time of day and a day of week at which the outgoing or incoming call is attempted to a preset active schedule, wherein the preset active schedule is modifiable by the subscriber;

routing the outgoing or incoming call through a Public Switched Telephone Network (PSTN) if the service is inactive;

comparing the called number to at least one telephone number on an authorized outgoing numbers list if the service is active, the at least one telephone number having at least seven digits;

routing the outgoing call through the PSTN if the called number is on the authorized outgoing numbers list;

advising the subscriber via the line that the outgoing call cannot be completed if the called number is not on the authorized outgoing numbers list;

responding to the incoming call if the service is active with a subscriber modifiable message; and routing the incoming call through the PSTN to the line if the service is active only in response to entry by the calling party of a privileged caller code (PCC).

12. The method of claim 11 wherein the authorized outgoing numbers list and the PCC may be modified by the subscriber.

13. The method of claim 11 wherein an outgoing telephone call from the line to an emergency telephone number is routed whether or not the emergency number is on the authorized outgoing numbers list.

14. The method of claim 11 wherein an outgoing telephone call from the line to an administration telephone number associated with the screening service is routed whether or not the administration number is on the authorized outgoing numbers list.

15. The method of claim 11 wherein the preset active schedule comprises a default schedule prior to deployment of the screening service on the line.

16. A system for controlling an outgoing telephone call from a telephone line associated with a subscriber to a called telephone number and an incoming telephone call from a calling party to the line, the system comprising:

means for detecting a trigger point on the line indicative of a screening service; and control logic operative to determine whether the screening service is active or inactive by comparing a time of day and a day of week at which the outgoing or incoming call is attempted to a preset active schedule, wherein the preset active schedule is modifiable by the subscriber, route the outgoing or incoming call through a Public Switched Telephone Network (PSTN) if the service is inactive, compare the called number to at least one telephone number on an authorized outgoing numbers list if the service is active, the at least one telephone number having at least seven digits, route the outgoing call through the PSTN if the called number is on the authorized outgoing numbers list, advise the subscriber via the line that the outgoing call cannot be completed if the called number is not on the authorized outgoing numbers list, respond to the incoming call if the service is active with a subscriber modifiable message, and route the incoming call through the PSTN to the line if the service is active only in response to entry by the calling party of a privileged caller code (PCC).

17. The system of claim 16 wherein the authorized outgoing numbers list and the PCC may be modified by the subscriber.

18. The system of claim 16 wherein the control logic is further operative to route an outgoing telephone call from the line to an emergency telephone number whether or not the emergency number is on the authorized outgoing numbers list.

19. The system of claim 16 wherein the control logic is further operative to route an outgoing telephone call from the line to an administration telephone number associated with the screening service whether or not the administration number is on the authorized outgoing numbers list.

20. The system of claim 16 wherein the preset active schedule comprises a default schedule prior to deployment of the screening service on the line.

* * * * *